United States Patent
Karlsson et al.

(10) Patent No.: US 9,635,080 B2
(45) Date of Patent: *Apr. 25, 2017

(54) CONTEXTUALLY AWARE CLIENT BUFFER THRESHOLDS

(71) Applicant: MobiTV, Inc., Emeryville, CA (US)

(72) Inventors: Kent Karlsson, Albany, CA (US); Tommy Isaksson, San Francisco, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,269

(22) Filed: May 16, 2014

(65) Prior Publication Data

US 2014/0250212 A1  Sep. 4, 2014

Related U.S. Application Data

(63) Continuation of application No. 13/111,151, filed on May 19, 2011, now Pat. No. 8,769,144.

(51) Int. Cl.
   *G06F 13/00* (2006.01)
   *H04L 29/06* (2006.01)
   (Continued)

(52) U.S. Cl.
   CPC .......... *H04L 65/60* (2013.01); *H04L 65/4084* (2013.01); *H04L 65/80* (2013.01); *H04N 21/2402* (2013.01); *H04N 21/44209* (2013.01); *H04N 21/440227* (2013.01); *H04N 21/6125* (2013.01); *H04N 21/6373* (2013.01); *H04N 21/8456* (2013.01)

(58) Field of Classification Search
   CPC ..... H04L 29/06; H04L 65/4084; H04L 65/80; H04L 65/60; H04L 21/2402; H04L 21/440227; H04L 21/44209; H04L 21/6125; H04L 21/6373; H04L 21/8456
   USPC .......... 709/231–235, 217–219, 203
   See application file for complete search history.

(56) References Cited

U.S. PATENT DOCUMENTS 6,760,303 B1   7/2004   Brouwer
7,319,860 B2   1/2008   Robertson et al.
(Continued)

FOREIGN PATENT DOCUMENTS

DE   112012002159 T5   2/2014
GB          2506047   3/2014
WO      2012158365 A1   11/2012

OTHER PUBLICATIONS

"U.S. Appl. No. 13/111,151, Final Office Action mailed May 24, 2013".

(Continued)

*Primary Examiner* — Kenneth R Coulter
(74) *Attorney, Agent, or Firm* — Kwan & Olynick LLP

(57) ABSTRACT

Client buffer thresholds are dynamically adjusted to provide quick start up and smooth playback in a variety of network conditions. In some examples, multiple buffer configurations are available. An initial buffer configuration may be used in typical circumstances and will yield good behavior in most cases. A modified buffer configuration can be used when limited available network resources prevent smooth playback. In some embodiments, a client buffer configuration is continuously adapted based on network throughput and data transfer rates.

20 Claims, 8 Drawing Sheets

(51) Int. Cl.
    *H04N 21/24*     (2011.01)
    *H04N 21/4402*     (2011.01)
    *H04N 21/442*     (2011.01)
    *H04N 21/61*     (2011.01)
    *H04N 21/6373*     (2011.01)
    *H04N 21/845*     (2011.01)

(56) References Cited

U.S. PATENT DOCUMENTS

| | | | |
|---|---|---|---|
| 8,223,641 | B2 | 7/2012 | Lee et al. |
| 8,250,233 | B2 | 8/2012 | Robertson et al. |
| 8,335,262 | B2 * | 12/2012 | Hluchyj ........... H04N 21/23406 370/477 |
| 8,769,144 | B2 * | 7/2014 | Karlsson et al. .............. 709/234 |
| 8,804,515 | B2 * | 8/2014 | Kampmann .................. 370/232 |
| 8,867,327 | B1 * | 10/2014 | Oberg .......................... 369/53.1 |
| 9,344,476 | B2 * | 5/2016 | Kampmann ...... H04L 29/06027 |
| 2008/0071921 | A1 | 3/2008 | Robertso et al. |
| 2008/0181221 | A1 * | 7/2008 | Kampmann ...... H04L 29/06027 370/389 |
| 2008/0186849 | A1 * | 8/2008 | Kampmann ...... H04L 29/06027 370/232 |
| 2008/0244042 | A1 | 10/2008 | Jamin et al. |
| 2009/0180534 | A1 * | 7/2009 | Hluchyj ........... H04N 21/23406 375/240.01 |
| 2010/0020686 | A1 | 1/2010 | Lee et al. |
| 2010/0162343 | A1 | 6/2010 | Roberts et al. |
| 2011/0083144 | A1 | 4/2011 | Bocharov et al. |
| 2012/0114302 | A1 | 5/2012 | Randall |
| 2012/0213070 | A1 | 8/2012 | Lee et al. |
| 2012/0297081 | A1 | 11/2012 | Karlsson et al. |

OTHER PUBLICATIONS

"U.S. Appl. No. 13/111,151, Non Final Office Action mailed Oct. 5, 2012".
"U.S. Appl. No. 13/111,151, Notice of Allowance mailed Feb. 19, 2014".
"U.S. Appl. No. 13/111,151, Response filed Feb. 4, 2013 to Non Final Office Action mailed Oct. 5, 2012".
"International Application Serial No. PCT/US2012/036451, Search Report and Written Opinion mailed Jul. 13, 2012".
"Int'l Application Serial No. PCT/US2012/036451, Preliminary Report on Patentability mailed Nov. 28, 2013".
Roy, "Architecture of a Modular Streaming Media Server for Content Delivery Networks", 2003 International Conference of Multimedia and EXPO (ICME), [Online]. Accessed on Jun. 13, 2012, Jul. 1, 2003 00:00:00.0.

* cited by examiner

CONTEXTUALLY AWARE CLIENT BUFFER THRESHOLDS

CROSS-REFERENCE TO RELATED APPLICATIONS

This application is a continuation of and claims priority to U.S. patent application Ser. No. 13/111,151, issued as U.S. Pat. No. 8,769,144, titled "CONTEXTUALLY AWARE CLIENT BUFFER THRESHOLDS", filed May 19, 2011, by Kent Karlsson and Tommy Isaksson, which is incorporated herein by reference in its entirety and for all purposes.

TECHNICAL FIELD

The present disclosure relates to contextually aware client buffer thresholds.

DESCRIPTION OF RELATED ART

Clients typically receive media over networks that have varying transmission rates, bandwidth, latency, and reliability. A media player at a client is typically configured with a buffer. However, client buffers typically have limited effectiveness in providing smooth playback under varying network conditions.

Conventional techniques and mechanisms for transmitting real-time media are limited. Consequently, it is desirable to provide improved techniques and mechanisms for improving media playback at a client.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
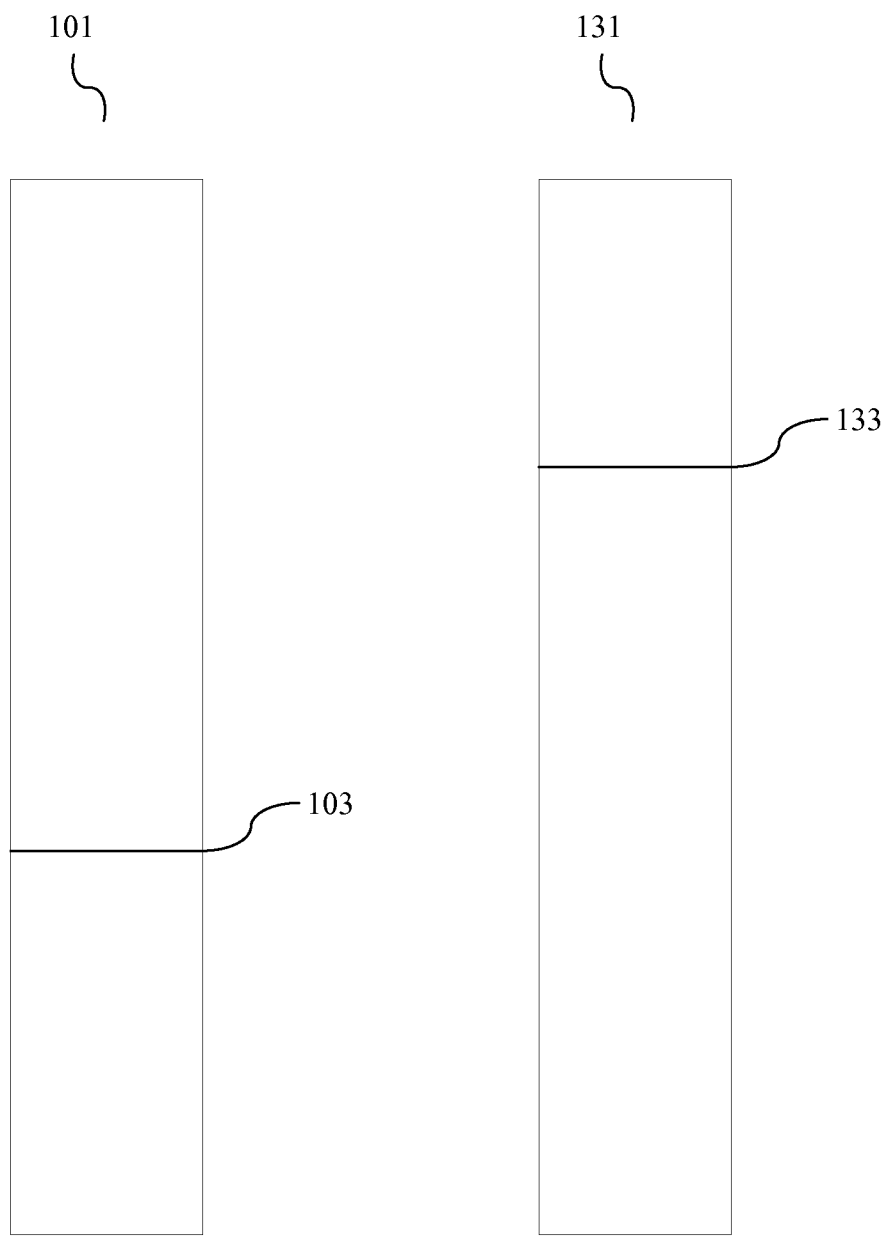
FIG. 1 illustrates one example of a buffer configuration.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context media player buffers. However, it should be noted that the techniques of the present invention apply to variations of buffering mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Client buffer thresholds are dynamically adjusted to provide quick start up and smooth playback in a variety of network conditions. In some examples, multiple buffer configurations are available. An initial buffer configuration may be used in typical circumstances and will yield good behavior in most cases. A modified buffer configuration can be used when limited available network resources prevent smooth playback. In some embodiments, a client buffer configuration is continuously adapted based on network throughput and data transfer rates.

Example Embodiments

A variety of mechanisms are used to deliver media streams to devices. In many instances, these mechanisms do not deliver data at a constant data rate. Network bandwidth, latency, throughput, and reliability may all vary depending on network conditions. Consequently, media players at client devices typically have buffers and buffer thresholds used to determine when playback begins or resumes. A large buffer having a high associated buffer threshold will take a long time to build but is tolerates adverse network conditions. A small buffer having a low associated buffer threshold will provide for quick initial playback but is difficult to maintain in many network circumstances.

Typical client devices have a single set of parameters. Once a decision is made regarding buffer size, a client device will typically behave well in a particular set of conditions but poorly in others. In some circumstances, a user can manually adjust buffer sizes and buffer thresholds. A user wanting a smoother playback experience may want to set a fairly large buffer while a user desiring quick playback can set a fairly small buffer. However, manually changing buffer sizes and buffer thresholds still does not account for widely varying network conditions that can occur during playback.

Consequently, the techniques and mechanisms of the present invention provide for multiple buffer configurations. In some examples, a small buffer is provided initially to focus on quick start up. If sufficient throughput is available, the small buffer will be built up and the session will behave well. Different bit rate streams may be transmitted from a content server while the client is using the initial buffer configuration. However, if there is still buffer depletion, a modified configuration is initiated. The second buffer configuration uses a larger buffer, but has a better chance of yielding good playback when network conditions are poor.

According to various embodiments, an initial buffer configuration includes multiple thresholds. Media playback does not begin until an initial buffer is filled to a high threshold. If the buffer continues to build, a media player may begin to receive a higher quality stream once the buffer reaches an even higher threshold. If the buffer begins to deplete, the media player may begin to receive a lower quality stream once the buffer depletes to a lower threshold.

In particular embodiments, if the buffer continues to deplete despite switching to one or more lower quality streams, a new buffer configuration may be established. The new buffer configuration may include a much larger buffer and higher thresholds with wider bands between thresholds. If a buffer continues to fill, a higher quality stream can be transmitted to the client. If the buffer continues to deplete, a lower quality stream is transmitted to the client.

Consequently, many client devices will play a media stream with quick start up times and smooth playback. An initial buffer configuration will be effective. Dynamic changes in media stream quality can be made during transmission based on buffer thresholds in an initial buffer configuration. However, if a buffer still depletes, a new buffer configuration is established. The new buffer configuration includes a larger buffer and higher threshold levels, making the new buffer more difficult to deplete. The new buffer will increase the chances of a smooth playback experience given adverse network conditions. According to various embodiments, even with the new buffer configuration, different threshold levels can trigger the transmission of lower or higher quality media streams.

It should be noted that in various embodiments, two buffer configurations are provided. One configuration provides a small buffer for quick start up and the other configuration provides a large buffer for smooth playback. However, in other instances, additional configurations and additional thresholds may be provided. The additional thresholds may be set incrementally, logarithmically, exponentially, empirically, etc.

In particular examples, a client establishes a session such as a Real-Time Streaming Protocol (RTSP) session. A server computer receives a connection for a media stream, establishes a session, and provides a media stream to a client device. The media stream includes packets encapsulating frames such as MPEG-4 frames. The MPEG-4 frames themselves may be key frames or differential frames. The specific encapsulation methodology used by the server depends on the type of content, the format of that content, the format of the payload, and the application and transmission protocols being used to send the data. After the client device receives the media stream, the client device decapsulates the packets to obtain the MPEG frames and decodes the MPEG frames to obtain the actual media data.

Conventional MPEG-4 files require that a player parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be recorded and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

TCP is more widely used than UDP and networking technologies including switch, load balancer, and network card technologies are more developed for TCP than for UDP. Consequently, techniques and mechanisms are provided for delivering fragmented live media over TCP. Sequence information is also maintained and/or modified to allow seamless client device operation. Timing and sequence information in a media stream is preserved.

Requests are exposed as separate files to clients and files should playback on players that handle fragmented MPEG-4. Live or near live, video on demand (VOD), and digital video record (DVR) content can all be handled using fragmentation.

FIG. 1 illustrates buffer configurations associated with a client device. According to various embodiments, buffer 101 includes a playback start threshold 103. In particular embodiments, data such as fragmented MPEG-4 packets are received and placed in the buffer. When the buffer 101 fills to the threshold 103, playback begins. According to various embodiments, an initial buffer configuration sets a playback start threshold 103 at a relatively low level based on typical network conditions. The relatively low level allows a buffer 101 to reach the playback threshold 103 in a relatively brief period of time. Playback can begin quickly. Data is added to the buffer 101 as data is received and data is removed from the buffer 101 as it is obtained for processing and playback. According to various embodiments, when the buffer 101 is depleted, a new buffer configuration can be loaded. A subsequent buffer configuration depicted in buffer 131 includes a higher playback start threshold 133. In particular embodiments, data such as fragmented MPEG-4 packets are received and placed in the buffer. When the buffer 131 fills to the threshold 133, playback begins. According to various embodiments, a modified initial buffer configuration sets a playback start threshold 133 at a relatively high level now that adverse network conditions are known. Playback does not begin until the buffer reaches the modified threshold 133.

It may now take longer to begin playback, but it is now more difficult to deplete the modified buffer. Data is added to the buffer 131 as data is received and data is removed from the buffer 131 as it is obtained for processing and playback.

Figure 2:
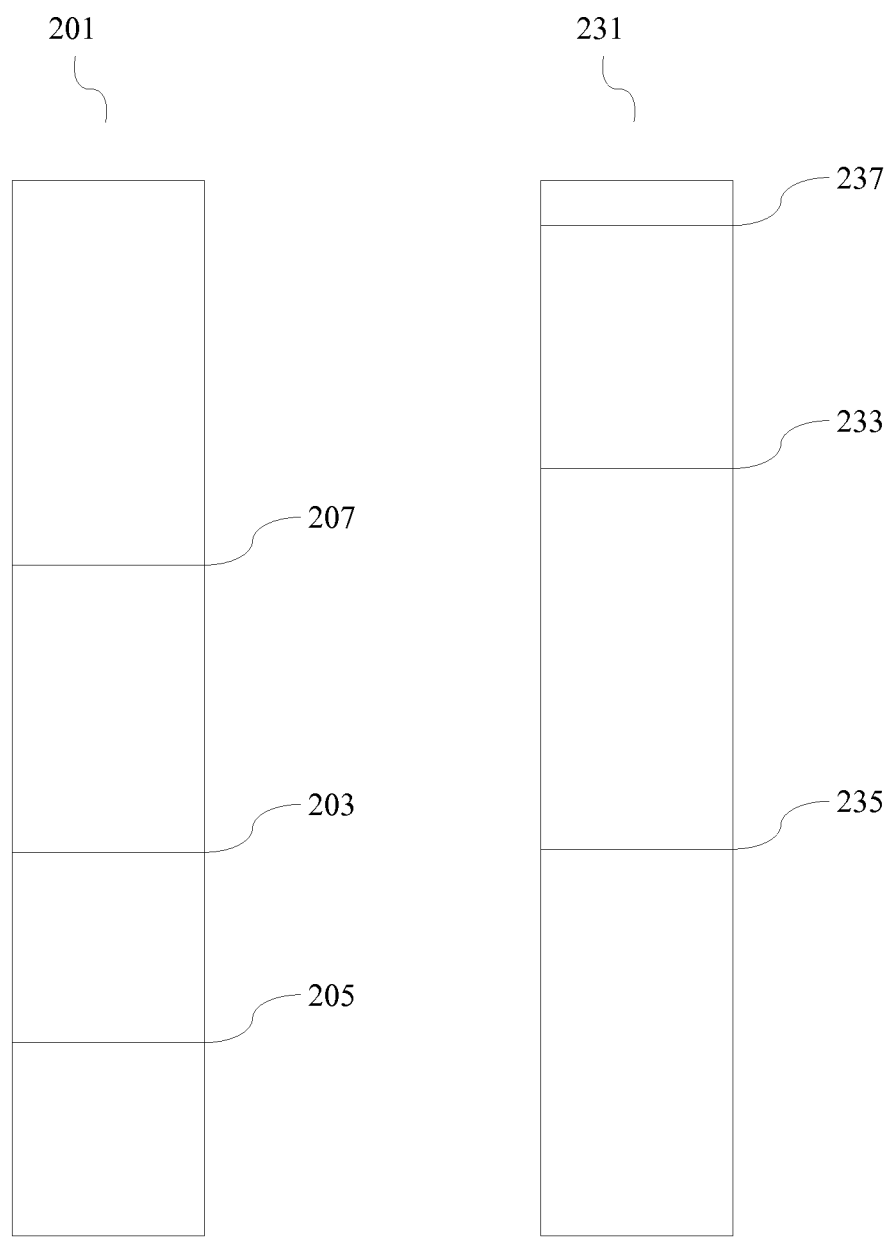
FIG. 2 illustrates one example of a buffer configuration having multiple thresholds.

FIG. 2 illustrates buffer configurations with multiple thresholds associated with a client device. An initial buffer 201 includes a playback start threshold 203. In particular embodiments, data such as fragmented MPEG-4 packets are received and placed in the buffer. When the buffer 201 fills to the threshold 203, playback begins. According to various embodiments, an initial buffer configuration sets a playback start threshold 203 at a relatively low level based on typical network conditions. If the buffer begins to deplete and reaches quality threshold 205, the media stream being transmitted to the device may be switched to a lower quality media stream. In some examples, the lower quality media stream has a lower bit rate than the initial media stream. A playback experience may continue uninterrupted, without any need to establish a new session. According to various embodiments, the media stream is quality shifted by a content server upon receiving a signal from the client that a quality threshold has been reached. The content server may replace higher quality MPEG-4 fragments with lower quality MPEG-4 fragments all while maintaining timing and sequence number information.

In some examples, if the buffer reaches a quality threshold 205, the stream is switched to a lower quality stream that allows playback of more content with fewer transmitted MPEG-4 fragments. Alternatively, if the buffer reaches a quality threshold 207, it is recognized that ample network resources are available. The content server can begin transmitting a higher quality stream while maintaining a seamless user viewing experience. A content server can quality shift a stream based on feedback information associated with the client device buffer. Nonetheless, if the buffer 201 still depletes, a different buffer configuration can be established.

According to various embodiments, a modified buffer configuration depicted as buffer 231 includes a higher playback start threshold 233. In particular embodiments, data such as fragmented MPEG-4 packets are received and placed in the buffer. When the buffer 231 fills to the threshold 233, playback begins. According to various embodiments, a modified initial buffer configuration sets a playback start threshold 233 at a relatively high level now that adverse network conditions are known. Playback does not begin until the buffer reaches the modified threshold 233. It may now take longer to begin playback, but it is now more difficult to deplete the modified buffer. Data is added to the buffer 231 as data is received and data is removed from the buffer 231 as it is obtained for processing and playback. According to various embodiments, buffer 231 also includes quality thresholds 235 and 237. If the buffer 231 depletes to a threshold 235, the quality of the stream is downgraded to compensate for adverse network conditions. The content server can again shift to a still even lower quality stream when the quality threshold 237 is reached.

Figure 3:
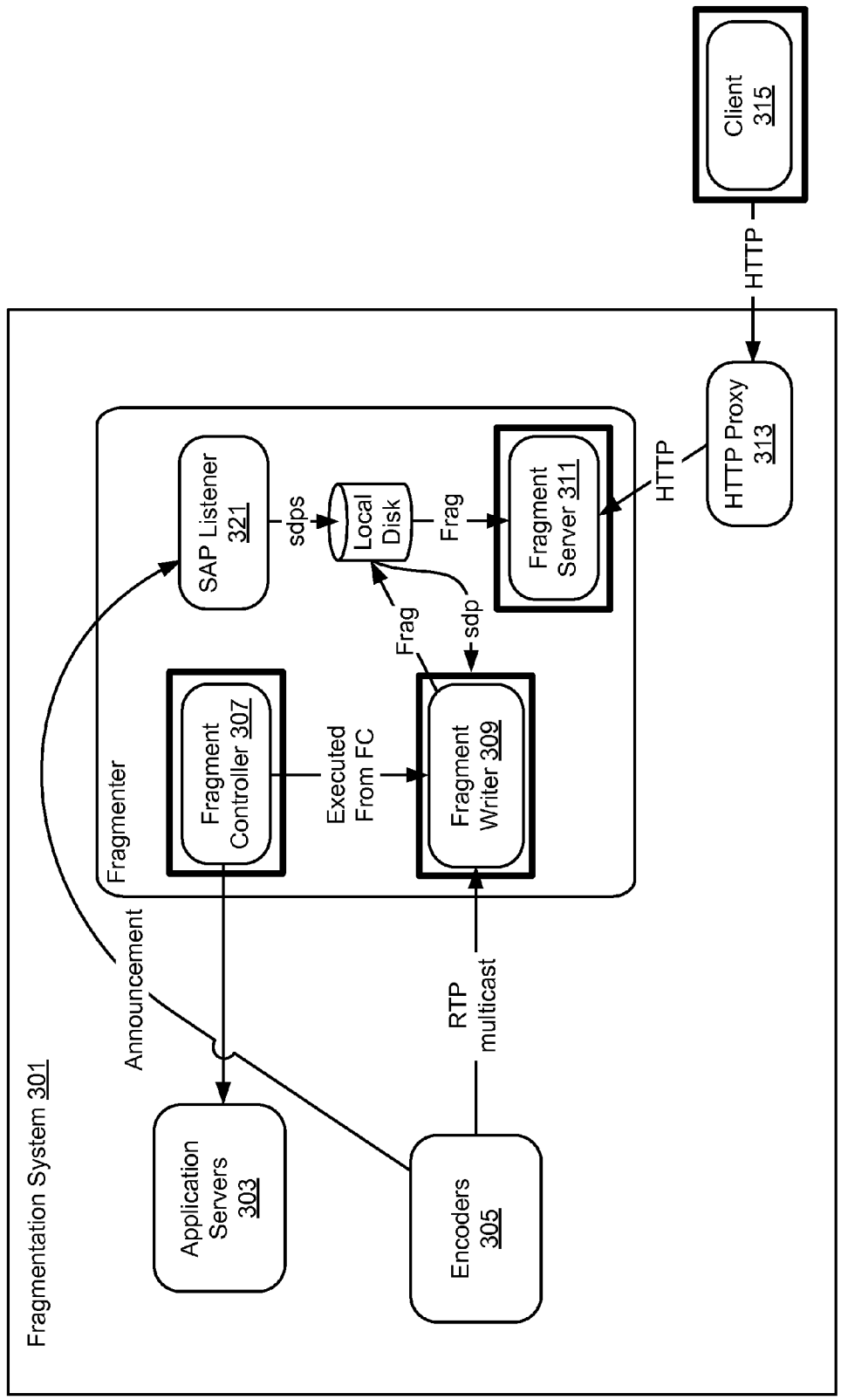
FIG. 3 illustrates one example of a fragmentation system.

FIG. 3 is a diagrammatic representation illustrating one example of a fragmentation system 301 associated with a content server that can use the techniques and mechanisms of the present invention. Encoders 305 receive media data from satellite, content libraries, and other content sources and sends RTP multicast data to fragment writer 309. The encoders 305 also send session announcement protocol (SAP) announcements to SAP listener 321. According to various embodiments, the fragment writer 309 creates fragments for live streaming, and writes files to disk for recording. The fragment writer 309 receives RTP multicast streams from the encoders 305 and parses the streams to repackage the audio/video data as part of fragmented MPEG-4 files. When a new program starts, the fragment writer 309 creates a new MPEG-4 file on fragment storage and appends fragments. In particular embodiments, the fragment writer 309 supports live and/or DVR configurations.

The fragment server 311 provides the caching layer with fragments for clients. The design philosophy behind the client/server API minimizes round trips and reduces complexity as much as possible when it comes to delivery of the media data to the client 315. The fragment server 311 provides live streams and/or DVR configurations.

The fragment controller 307 is connected to application servers 303 and controls the fragmentation of live channel streams. The fragmentation controller 307 optionally integrates guide data to drive the recordings for a global/network DVR. In particular embodiments, the fragment controller 307 embeds logic around the recording to simplify the fragment writer 309 component. According to various embodiments, the fragment controller 307 will run on the same host as the fragment writer 309. In particular embodiments, the fragment controller 307 instantiates instances of the fragment writer 309 and manages high availability.

According to various embodiments, the client 315 uses a media component that requests fragmented MPEG-4 files, allows trick-play, and manages bandwidth adaptation. The client communicates with the application services associated with HTTP proxy 313 to get guides and present the user with the recorded content available.

Figure 4:
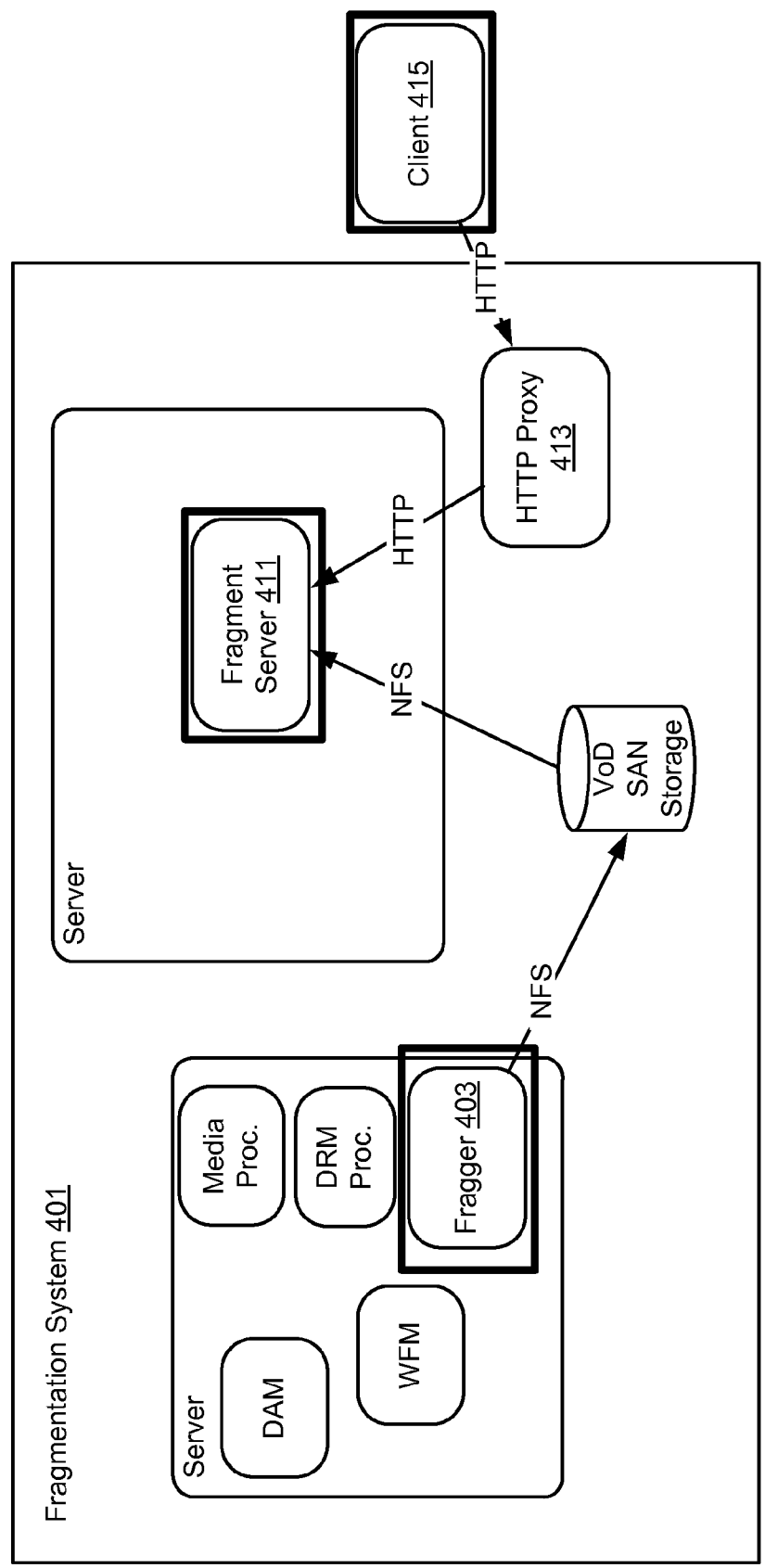
FIG. 4 illustrates another example of a fragmentation system.

FIG. 4 illustrates one example of a fragmentation system 401 that can be used for video on demand content. Fragger 403 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 411 provides the caching layer with fragments for clients. The design philosophy behind the client/server API minimizes round trips and reduces complexity as much as possible when it comes to delivery of the media data to the client 415. The fragment server 411 provides VoD content.

According to various embodiments, the client 415 uses a media component that requests fragmented MPEG-4 files, allows trick-play, and manages bandwidth adaptation. The client communicates with the application services associated with HTTP proxy 413 to get guides and present the user with the recorded content available.

Figure 5:
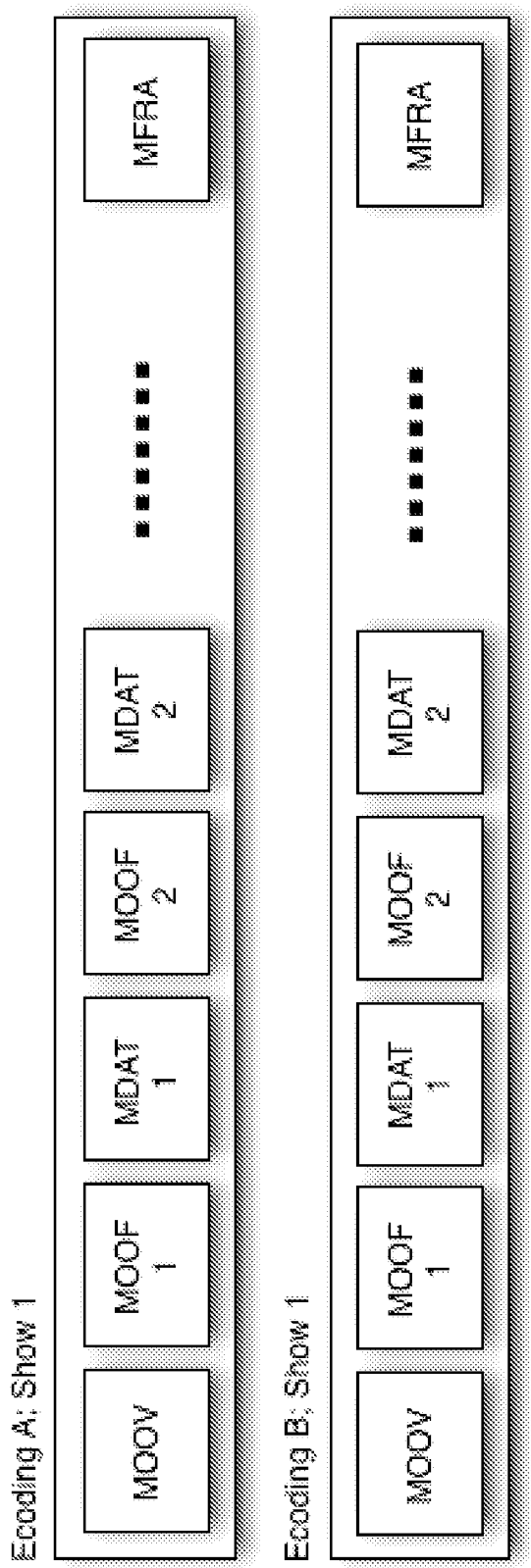
FIG. 5 illustrates examples of files stored by a fragment writer.

FIG. 5 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video, seek to any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format: http://{HOSTNAME}/frag/{CHANNEL}/{BITRATE}/[{ID}/]{COMMAND}[/{ARG}] e.g. http://frag.hosttv.com/frag/1/H8QVGAH264/1270059632.mp4/fragment/42. According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42 this portion would be "fragment/42".

The URL format makes the requests content delivery network (CDN) friendly because the fragments will never change after this point so two separate clients watching the same stream can be serviced using a cache. In particular, the headend architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. We propose that it uses a configured filter that is executed by the Fragment Controller to generate the list of broadcasts to be recorded. This filter integrates with external components such as a guide server to determine which shows to record and the broadcast ID to use.

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MP4 file has a sequence number. Using this knowledge and a well defined URL structure for communicating with the server, the client requests fragments individually as if it was reading separate files from the server simply by requesting urls for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bitrate.

Because each request to the server looks like a request to a separate file, the response to requests can be cached in any HTTP Proxy, or be distributed over any HTTP based CDN.

Figure 6:
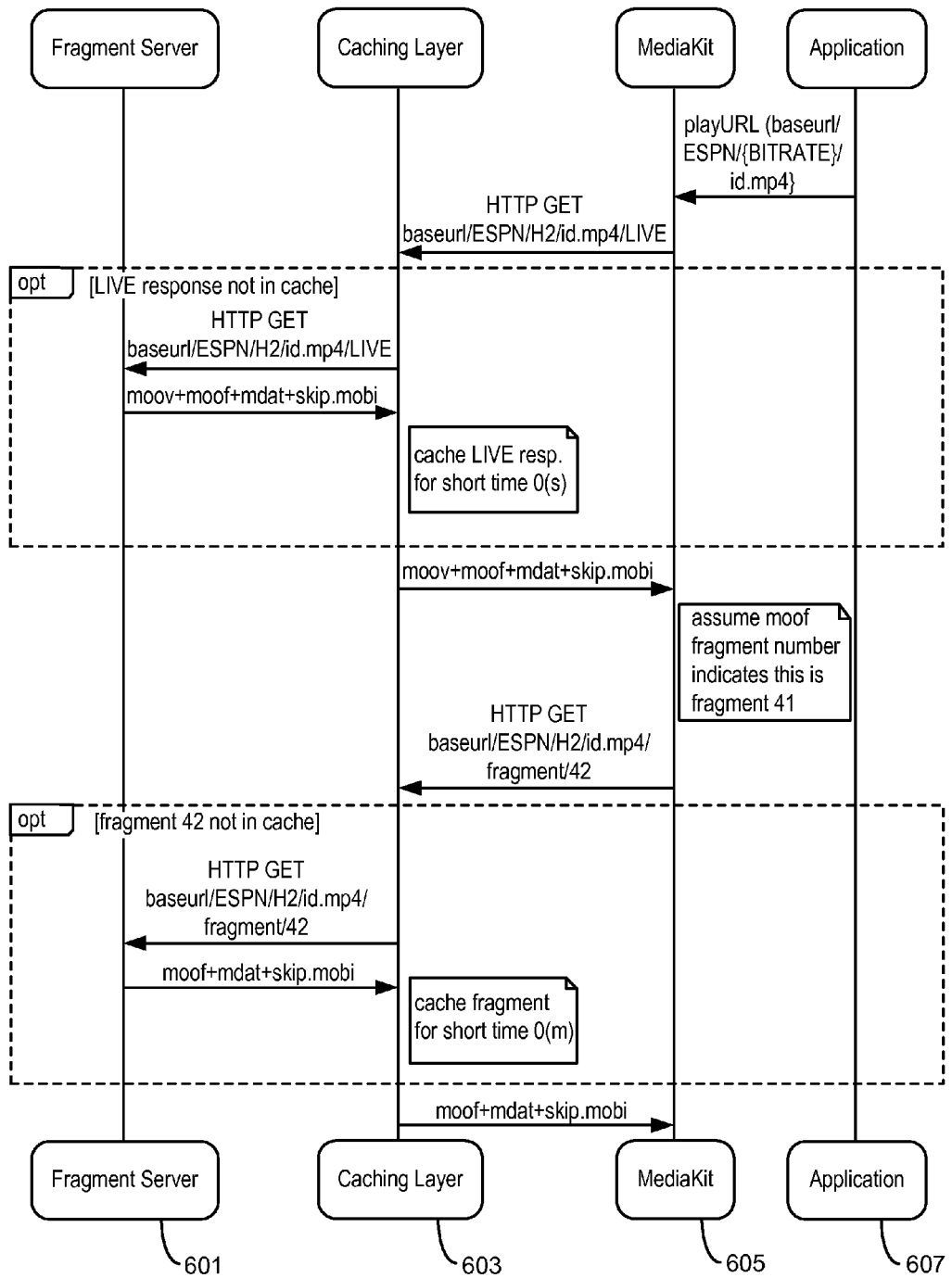
FIG. 6 illustrates one example of an exchange used with a fragmentation system.

FIG. 6 illustrates an interaction for a client receiving a live stream. The client starts playback when fragment plays out from the server. The client uses the fragment number so that it can request the appropriate subsequence file fragment. An application such as a player application 607 sends a request to mediakit 605. The request may include a base address and bit rate. The mediakit 605 sends an HTTP get request to caching layer 603. According to various embodiments, the live response is not in cache, and the caching layer 603 forward the HTTP get request to a fragment server 601. The fragment server 601 performs processing and sends the appropriate fragment to the caching layer 603 which forwards to the data to mediakit 605.

The fragment may be cached for a short period of time at caching layer 603. The mediakit 605 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 605 may request a next fragment having a different data rate. In some instances, the mediakit 605 may request a next fragment having a higher data rate. According to various embodiments, the fragment server 601 maintains fragments for different quality of service streams with timing synchronization information to allow for timing accurate playback.

The mediakit 605 requests a next fragment using information from the received fragment. According to various embodiments, the next fragment for the media stream may be maintained on a different server, may have a different bit rate, or may require different authorization. Caching layer 603 determines that the next fragment is not in cache and forwards the request to fragment server 601. The fragment server 601 sends the fragment to caching layer 603 and the fragment is cached for a short period of time. The fragment is then sent to mediakit 605.

Figure 7:
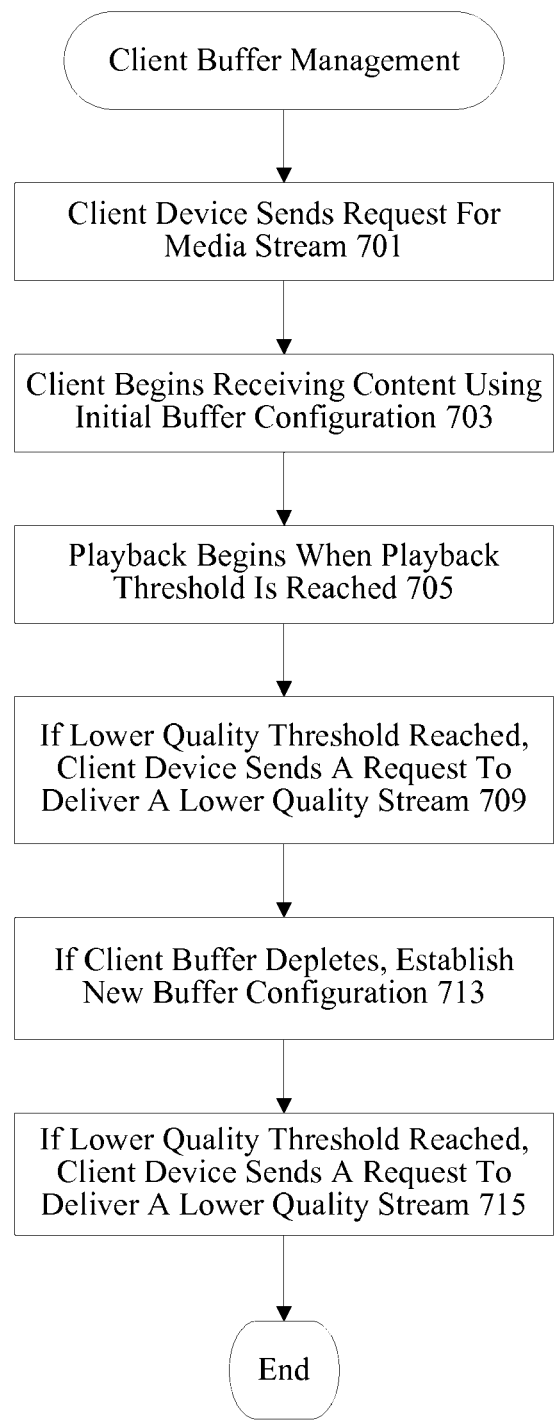
FIG. 7 illustrates one technique for buffer configuration.

FIG. 7 illustrates one example of a technique for managing buffer configuration. At 701, a client device sends a request for a media stream. According to various embodiments, the client device provides information about the client device to a content server such as a fragment server. Information may include resolution, buffer size, processing capabilities, network throughput, average data transfer rates, location, etc. In particular embodiments, the content server already has information about the client device. The content server selects a stream with an appropriate quality level for delivery to the client device. At 703, the client device begins receiving content using an initial buffer configuration. When a playback threshold is reached at 705, playback begins. According to various embodiments, if a lower quality threshold is reached, the client device sends a request to the content server to deliver a lower quality stream at 709. The lower quality stream may be a lower bit rate stream. Multiple lower quality thresholds may be established. In some instances, if a higher quality threshold is reached as a buffer fills during playback, a client device can send a request to the content server to begin receiving a higher quality stream. Quality shifting can be performed based on buffer levels.

If a client device buffer depletes, a new buffer configuration is established 713. The modified buffer configuration includes a higher playback start threshold. The higher playback start threshold may delay initiation of playback, but decreases the chance that the buffer will deplete. Nonetheless, if the buffer still begins to deplete and hits a lower quality threshold, the client device sends a request to the content server to receive a lower quality stream at 715. In some embodiments, if the buffer depletes again, additional modified buffer configurations can be established.

Figure 8:
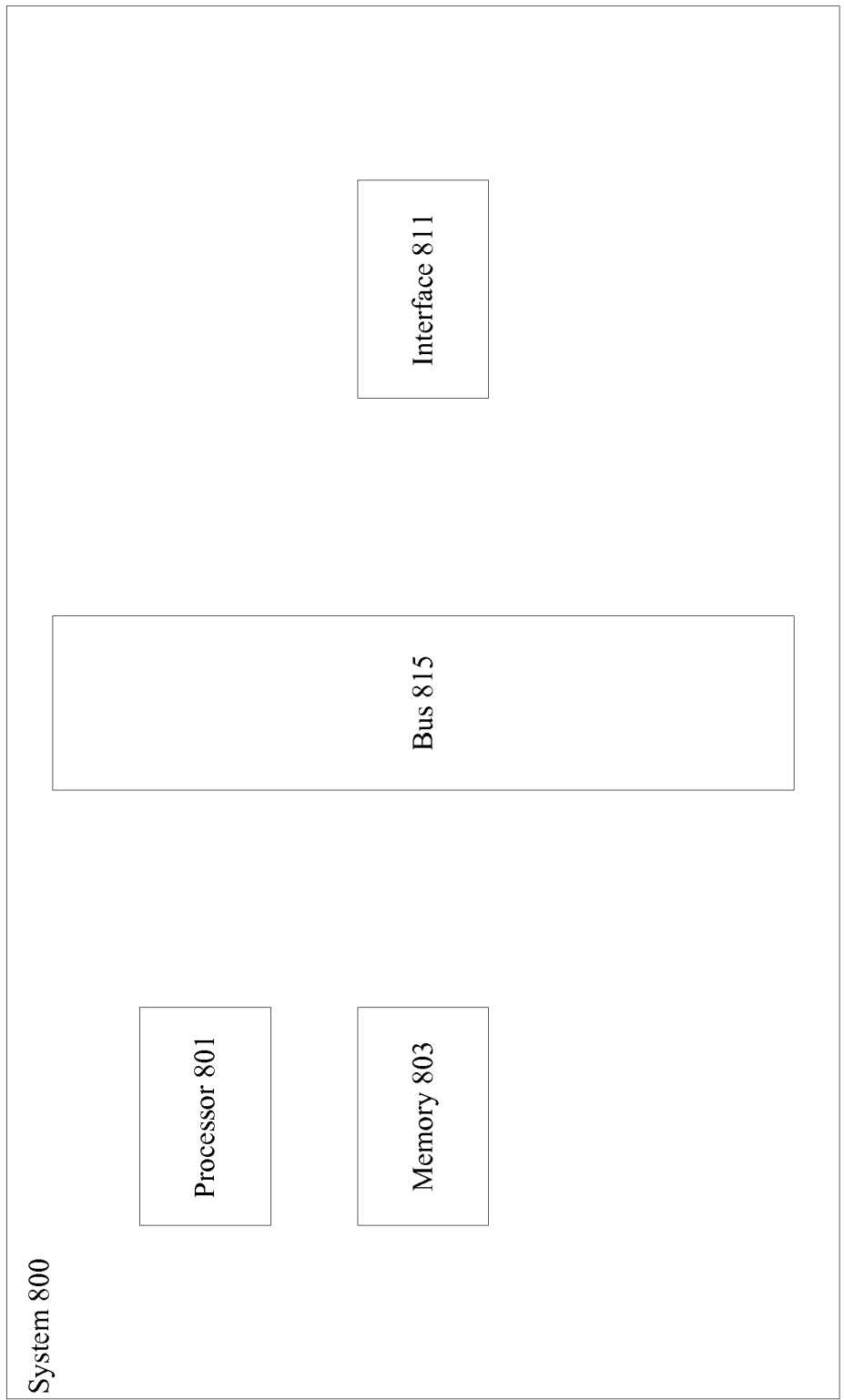
FIG. 8 illustrates one example of a system.

FIG. 8 illustrates one example of a fragment server. According to particular embodiments, a system 800 suitable for implementing particular embodiments of the present invention includes a processor 801, a memory 803, an interface 811, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 811 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 800 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
   receiving, at a content server, a first request for a media stream from a client device transmitted via a network;
   transmitting from a communications interface at the content server a first quality level media stream at a first bit rate to an initial playback buffer established at the client device, the client device including a hardware processor configured to begin playback of the first quality level media stream after an initial playback threshold in the initial playback buffer is reached; and
   receiving, at the content server, a second request for a second quality level media stream at a second bit rate different than the first bit rate after an initial quality threshold in the initial playback buffer is reached at the client device, the client device configured to establish a modified playback buffer if the initial playback buffer depletes, wherein the modified playback buffer has a modified playback threshold higher than the initial playback threshold, the second request received via the network.

2. The method of claim 1, wherein the second quality level media stream delivers the same content as the first quality level media stream but at a lower bit rate.

3. The method of claim 1, wherein the second quality level media stream delivers the same content as the first quality level media stream but at a higher bit rate.

4. The method of claim 1, the method further comprising:
   receiving a third request at the content server from the client device for a third quality level media stream after a modified quality threshold associated with the modified playback buffer is reached.

5. The method of claim 1, wherein the first quality level media stream comprises a first fragment encoded at a first bit rate.

6. The method of claim 5, wherein the first fragment includes a first fragment number and a box structure supporting synchronization information, chapter information, and end of file information.

7. The method of claim 6, wherein synchronization information is used to synchronize audio and video when playback entails starting in the middle of a stream.

8. The method of claim 6, wherein the second quality level media stream comprises a second fragment encoded at a second bit rate.

9. The method of claim 8, wherein the second fragment includes a second fragment number and box structure supporting synchronization information, chapter information, and end of file information, wherein the second fragment number is derived from the first fragment number.

10. The method of claim 6, wherein the first fragment number corresponds to a time index for a near-live media program.

11. A system, comprising:
a hardware processor operable to process a first request for a media stream received from a client device;
memory operable to store a first quality level media stream at a first bit rate to an initial playback buffer established at the client device, the client device configured to begin playback of the first quality level media stream after an initial playback threshold in the initial playback buffer is reached; and
a communications interface operable to receive a second request for a second quality level media stream at a second bit rate different than the first bit rate after an initial quality threshold in the initial playback buffer is reached at the client device, the client device configured to establish a modified playback buffer if the initial playback buffer depletes, wherein the modified playback buffer has a modified playback threshold higher than the initial playback threshold.

12. The system of claim 11, wherein the second quality level media stream delivers the same content as the first quality level media stream but at a lower bit rate.

13. The system of claim 11, wherein the second quality level media stream delivers the same content as the first quality level media stream but at a higher bit rate.

14. The system of claim 11, wherein the communications interface is further operable to receive a third request at the content server from the client device for a third quality level media stream after a modified quality threshold associated with the modified playback buffer is reached.

15. The system of claim 11, wherein the first quality level media stream comprises a first fragment encoded at a first bit rate.

16. The system of claim 15, wherein the first fragment includes a first fragment number and a box structure supporting synchronization information, chapter information, and end of file information.

17. The system of claim 16, wherein synchronization information is used to synchronize audio and video when playback entails starting in the middle of a stream.

18. The system of claim 16, wherein the second quality level media stream comprises a second fragment encoded at a second bit rate.

19. The system of claim 18, wherein the second fragment includes a second fragment number and box structure supporting synchronization information, chapter information, and end of file information, wherein the second fragment number is derived from the first fragment number.

20. One or more non-transitory computer readable media having instructions stored thereon for performing a method, the method comprising:
receiving, at a content server, a first request for a media stream from a client device transmitted via a network;
transmitting from a communications interface at the content server a first quality level media stream at a first bit rate to an initial playback buffer established at the client device, the client device including a hardware processor configured to begin playback of the first quality level media stream after an initial playback threshold in the initial playback buffer is reached; and
receiving, at the content server, a second request for a second quality level media stream after an initial quality threshold in the initial playback buffer is reached at the client device, the client device configured to establish a modified playback buffer if the initial playback buffer depletes, wherein the modified playback buffer has a modified playback threshold higher than the initial playback threshold, the second request received via the network.

* * * * *